Patented Nov. 7, 1939

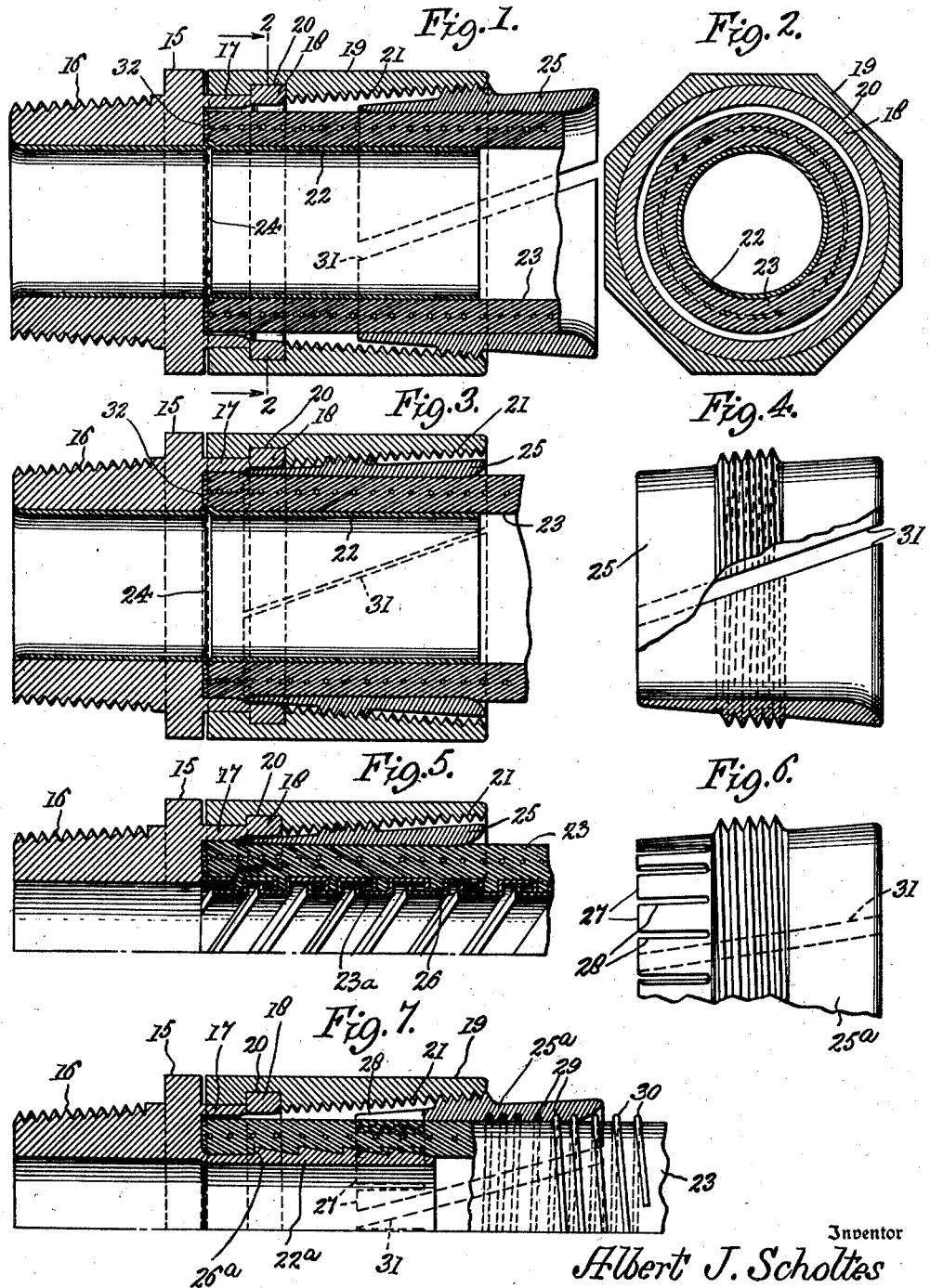

2,179,200

UNITED STATES PATENT OFFICE 2,179,200

HOSE COUPLING

Albert J. Scholtes, Baltimore, Md.

Application July 6, 1938, Serial No. 217,766

4 Claims. (Cl. 285—86)

The present invention relates to couplings which may be used on hose, pipes or the like, and has as an object to provide a coupling wherein a contracting annular wedging action is produced for not only contracting and binding the end of a hose in the coupling, but also advancing the extremity of the hose into the coupling and against a shoulder for effectively sealing the end face of the hose in the coupling by a powerful axial thrust.

Another object of the invention is to provide a coupling with a rotatable part, a hose compressing part having, generally, only an axial movement, and wherein the coupling parts are constructed so as to couple hose of a given inside diameter but which may vary as to outside diameters or wall thickness.

Another object of the invention is to provide a coupling having these characteristics and which comprises but relatively few parts capable of operation with a minimum of effort to obtain a high degree of pressure upon the hose, and to hold the coupling upon the hose and resist leakage and pulling out of the hose when the latter is subjected to high pressure and to pulling strains and rough treatment.

Another object of the invention is to provide a hose coupling with rotatable part in threaded engagement with a follower ring or part for drawing the latter into the rotatable part and contracting and compressing the ring upon the hose while the ring is advanced axially forwardly without rotatable friction on the hose surface into the coupling and while in contact with the hose to compress and urge the hose into tight sealing engagement within the coupling.

With the foregoing and objects in view, the invention will be more fully described hereinafter, and will be more particularly pointed out in the claims appended hereto.

In the drawing, wherein like symbols refer to like or corresponding parts throughout the several views:

Figure 1 is a longitudinal sectional view taken through a hose coupling constructed according to the present invention and as initially applied to a hose ready to be secured or tightened thereon.

Figure 2 is a transverse section taken on the line 2—2 of Figure 1, showing the swivel connection of the rotating part or sleeve with the nut of the coupling.

Figure 3 is a view similar to Figure 1, but with the coupling turned up into binding engagement upon the hose showing the latter compressed and advanced into sealing engagement in the coupling.

Figure 4 is a detail side elevation, partly in section, of the split ring or follower of the coupling.

Figure 5 is a fragmentary longitudinal section taken through a slightly modified form of the coupling, showing the nut without the nipple for a hose with a metal reinforcing liner, the parts being in compressed position.

Figure 6 is a fragmentary side elevation of a modified form of split ring or follower, showing spring tongues at its forward end, and Figure 7 is a fragmentary longitudinal section taken through another modified form of the coupling, showing the split ring of Figure 6 therein and the mounting of a cuff on the ring for protecting the hose.

Referring now to the drawing, and first to the form of the coupling shown in Figures 1 to 4, 15 designates a nut provided at one side with a coupling portion 16 shown in the present instance as a threaded spud or tail piece, to which may be attached a nozzle, or the complemental nut portion of a hose coupling or the like. The nut 15 is provided at its other side with an axially extending flange 17 of less external diameter than the nut 15 and which, at its outer edge, has a struck up bead or shoulder 18. A sleeve 19 is fitted at one end over the flange 17 and provided with an annular groove 20 proportioned to interfit with the bead 18 for holding the sleeve 19 to the nut 15 and permitting the free turning of the sleeve on the nut. The sleeve 19 is provided with a taper-threaded inner wall 21, and the bead 18 and flange 17 have a portion of their inner walls recessed slightly substantially in line with the threaded wall 21 of the nut 19.

The nut 15 carries a nipple 22 which extends into the sleeve 19 in spaced relation thereto and provides therewith an annular space into which the free end of a hose 23, or the like, is received. Where the nipple is manufactured separately from the nut 15, as shown in Figures 1 and 3, the nipple 22 is provided with a stop bead 24 which engages the adjacent side of the nut 15 and determines the positioning of the nipple within the nut. The bead 24 also serves as a stepped shoulder against and about which the extremity of the inner rubber layer of the hose 23 may be molded and sealed when the hose is compressed in the coupling.

A split ring or follower 25, of axially wedge shape, is movably placed within the sleeve 19 and has an intermediate externally threaded portion, the threads of which may be tapered to correspond with the threads of the wall 21 within the sleeve 19 so that as the latter is turned the ring or follower 25 is drawn into the coupling axially toward the nut 15. The split ring or follower 25 is adapted to frictionally engage about the outer surface of the hose 23 and as the follower 25 is axially advanced into the coupling, the follower is gradually contracted about the hose, incident to the tapered thread of the inner wall 21 of the sleeve and to the diagonal split 31 in the follower 25, and the hose is compressed about the nipple 22. The frictional engagement between the follower 25 and the hose 23 is such that the follower is held from turning on the hose. As the follower progresses axially into the coupling the hose is urged forwardly toward the adjacent face 32 of the nut 15 and is caused to become compressed and to expand within the coupling, particularly within the pocket of the flange 17. The recessed inner wall of the bead 18 receives the smaller end of the tapering follower 25 so that the latter, as shown in Figure 3, may be advanced to a considerable extent into the coupling to effectively compress and seal the end of the hose therein, this action being governed by the wall thickness of the hose being coupled.

As shown in Figure 5, the nipple 22 may be omitted where the hose 23 has a metal inner lining 23ª as the latter is of sufficient strength to support the hose against collapsing under pressure of the coupling and provides an indented or threaded outer surface 26 which interlocks with the inner wall material of the hose 25. The inner lining 23ª is also axially collapsible or compressible under the endwise thrust on the hose so that the end of the hose body may be compressed against the end wall of the coupling and expanded to fill in the space thereabout and form a head to prevent the pulling out of the hose from the coupling.

As shown in Figure 6, the split ring or follower 25ª may have a plurality of spring tongues 27 at its forward smaller end, and the tongues may be provided by merely slitting the inner reduced end of the ring as shown at 28. Thus, when the tongues 27 engage within the bead 18, the tongues are independently flexed against the outer surface portion of the hose 23 to effectively grip and bind upon the same.

As the modified form of split ring 25ª advances axially into the coupling, the slits 28 in the smaller advancing end of the ring 25ª permit the tongues 27 to spring outwardly to a slight extent under the action of the compression of the larger end of the ring so that the material of the hose 23 within the tongues 27 may expand under axial compression and fill the pocket within the flange 17 and between the tongues 27 into the slits 28 and effectively seal the hose therein.

In the modification shown in Figure 7, the modified form of follower 25ª is shown as applied to the modified construction of coupling shown in Figure 5, and wherein the follower 25ª is provided with a threaded groove 29, being of opposite hand of the thread of the sleeve wall 21, for receiving one end of a cuff 30, the latter being constructed of a coil of spring wire or the like. In this instance the threaded groove 29 extends in an opposite direction to that in which the split sleeve 25 may initially turn for effectively carrying the cuff 30 with the ring or follower as it is advanced into the coupling.

In Figure 7 the nipple 22ª is shown with shouldered teeth or projections 26ª although any desired surface formation may be used as desired.

It is to be understood that where a hose having a metal inner lining, as shown in Figure 5, is to be coupled, the nipple 22 may be entirely dispensed with, as the metal liner serves to prevent the inward collapse of the hose as it is being compressed by the ring 25.

What is claimed is:

1. A hose coupling comprising an end wall having a nipple extending from the inenr side thereof to receive the end of a hose thereover, a sleeve rotatably connected to the end wall and extending therefrom in spaced relation about the nipple and against endwise movement relative to the end wall, and a follower member disposed in taper-threaded engagement within the sleeve for contraction about the end of a hose, said sleeve having an inwardly tapering inner wall and adapted to be rotated to draw and contract the follower member into the sleeve, whereby the follower member advances the hose over the nipple and against said end wall to compress the hose against the end wall and about the nipple and expand the end of the hose against the end of the follower member for holding the hose from pulling out of the coupling.

2. A hose coupling, comprising a coupling nut having a threaded spud at one side for attachment to a hose nozzle or the like and having an end wall and a beaded flange at its opposite side adapted to fit over the end of a hose having a metal inside liner which supports the hose against collapse, a sleeve fitting at one end over the flange and having an internal annular groove receiving the bead of the flange for coupling the sleeve to the nut for relative turning thereon, said sleeve having an internally threaded wall flaring toward its opposite end, and a split tapering ring providing a follower for engagement about the hose and externally threaded for engagement within the sleeve and adapted for advancement toward the nut when the sleeve is turned to compress the follower about the hose and advance the latter to distort and expand the hose against said end wall and against the end of the follower to form an anchoring head and prevent pulling out of the hose from the end of the coupling.

3. A hose coupling, comprising a nut having at one side thereof a wall adapted to receive thereagainst an internally supported hose and having a flange extending about the wall to provide an annular space for the reception of the extremity of the hose, a sleeve rotatably mounted on the flange and having a threaded inner wall flaring outwardly from the flange, said flange having a recess in its inner wall providing substantially a continuation of the inner wall of the sleeve, and a split ring adapted to engage about the hose end and having exterior threads for engagement with the inner wall of the sleeve and tapering inwardly, said sleeve adapted to be turned upon the flange for drawing the split ring and the hose into the sleeve and contracting the ring upon the hose, the reduced end of the split ring adapted to enter the recess in the inner wall of the flange and to advance and axially compress the end of the hose against the nut wall and to expand the hose end within the flange and into said recess about the end of the split ring to seal the hose in the coupling and form an anchoring head on the end of the hose to prevent the hose from pulling out of the coupling.

4. A hose coupling, comprising a nut having at one side an abutment wall adapted to receive the end of a hose thereagainst and having a marginal flange about the wall to receive therein the hose end when abutting the wall, means to prevent inward collapsing of the hose, a sleeve rotatably connected to the flange and having an inner threaded wall flaring outwardly from the nut, and a split follower ring adapted for engagement about the hose and having an outer threaded wall tapering toward the nut for engagement in the sleeve and with the threads thereof to advance the split follower into the sleeve and contact and grip the follower on the hose for advancement therewith, the reduced inner end of the split follower being slitted to provide a plurality of spring tongues adapted to be compressed against the outer surface of the hose as the follower is moved into its final position in the reduced end of the sleeve to distort and expand the hose against the abutment wall and its marginal flange and about the end of the follower for forming an anchoring head on the hose to prevent the pulling out of the hose from the coupling.

ALBERT J. SCHOLTES.